Patented Oct. 24, 1922.

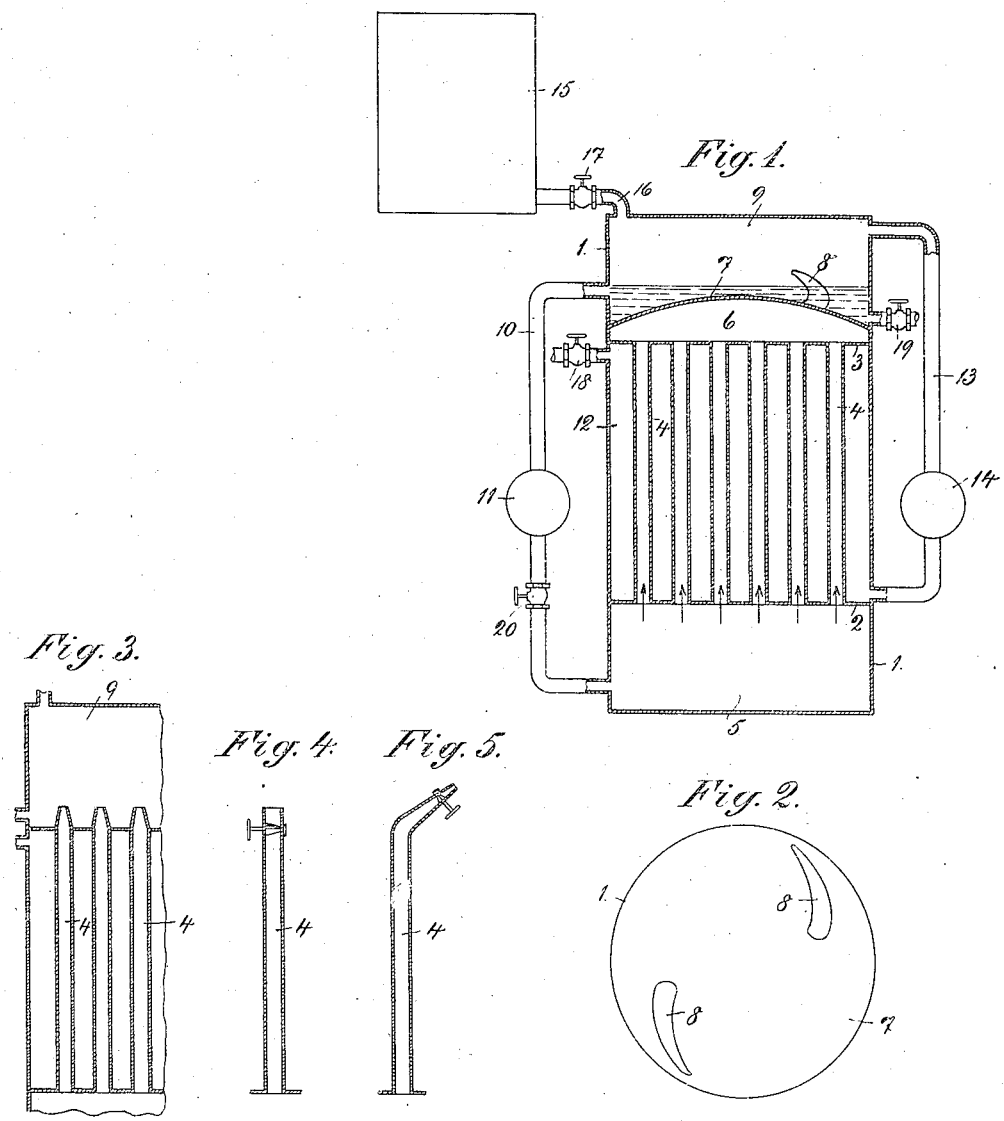

1,433,040

UNITED STATES PATENT OFFICE.

ERIK SIXTEN SANDBERG, OF SKUTSKAR, SWEDEN.

METHOD OF CONTINUOUSLY EVAPORATING LIQUIDS AND IN EVAPORATING APPARATUS.

Application filed September 5, 1918. Serial No. 252,700.

*To all whom it may concern:*

Be it known that ERIK SIXTEN SANDBERG, chief engineer, a subject of the King of Sweden, residing at Skutskar, in the Kingdom of Sweden, has invented certain new and useful Improvements in the Method of Continuously Evaporating Liquids and in Evaporating Apparatus, of which the following is a specification.

In such methods for continuously evaporating liquids where the vapours escaping from the liquid are compressed and again utilized for evaporating other quantities of the liquid one has hitherto been obliged, in order to obtain practical results, to spread the liquid in the form of a thin layer on the heating surfaces, for instance on the inner walls of externally heated vertical tubes, so that the generated vapours can freely escape through the free spaces within the tubes.

If the tubes were to be wholly filled with liquid the capacity of the apparatus would be considerably reduced due to the fact partly that the steam bubbles would form an insulating layer between the walls of the tubes and the liquid, and partly that the liquid would cause a pressure counteracting the free escape of the vapours.

It is, however, very difficult to effect a uniform distribution of liquid over the whole heating surfaces which is very important with regard to the capacity of the apparatus. If such a uniform distribution be not effected, the thin liquid layer will very easily become evaporated to a dry layer so that heat insulating covering would be formed on the inner side of the tubes making it necessary to interrupt the work of the apparatus for removing the same.

Moreover, in apparatus of the kind described liquid particles are carried off with the vapours to the compressor and into the steam chamber, which causes considerable drawbacks in several respects and represents a loss in case of valuable liquids.

My present invention now refers to a method of continuously evaporating liquids or solutions by the use of which the above drawbacks are removed.

The said method consists essentially in forcing the liquid by means of a pump or similar device through throttled passages of a heating element in such a manner that a sufficiently effective resistance to the movement of the liquid only is created for maintaining the liquid during the heating operation at a pressure higher than the pressure at which the liquid boils at the existing temperature, and that the liquid after having passed the throttled passages is allowed to expand. By proceeding in this way the advantage is gained that the passages of the heating element can be held wholly filled with liquid during the heating operation without allowing substantial amounts of vapor to be generated within the tubes, the vapours being generated only after the liquid has passed through the throttled passages in the heating element into a chamber where the vapours are given off due to the fact that the pressure within said chamber is lower than that within said passages.

Another feature of my invention consists in thereafter leading the liquid tangentially against the cylindrical wall of the expanding chamber, in order that the vapours may be freed from liquid particles, partly on account of their adhesion to the walls and partly on account of the action of centrifugal force on the rotating mass of vapor carrying the liquid particles.

Another feature of my invention consists in the fact that, on tapping out from the expansion chamber a certain quantity of concentrated liquid, a quantity of unconcentrated liquid equivalent thereto, is introduced into the circulating liquid, so as to maintain the boiling point of the circulating liquid substantially constant.

Another feature of my present invention consists in the fact that the evaporating process is executed at a temperature below 100° C. by applying a vacuum to the system for the purpose of avoiding the formation of incrustations on the interior of the heating elements.

Other features of my invention are set forth in the following description.

The invention also refers to improvements in apparatus adapted to be used in carrying the above method into practice.

The main feature of the apparatus consists in providing the passages of the heating element, through which the liquid is forced by a pump or the like, at or near the outlet ends with throttlings or throttling devices or with special throttled nozzles which may, if wanted, be provided with throttling devices, such as valves.

According to a preferred form of the apparatus the passages consist of tubes without throttlings that open into a common chamber provided with one or more throttled nozzles that open into the expansion chamber.

These nozzles are preferably located tangentially in relation to the cylindrical wall of the expansion chamber.

It is suitable to locate, in the pressure conduit of the circulation pump, a valve or other throttling device in order to make possible a further regulating of the pressure of the liquid.

A form of embodiment of the apparatus is illustrated on the accompanying drawing, the method being rendered clear by the following description of said apparatus.

Fig. 1 is a vertical section through a preferred form of the apparatus, Fig. 2 is a plan view of the same with the upper wall removed. Figs. 3–5 show details of modified form of construction.

1 is a closed receptacle provided with transverse partitions 2 and 3 between which are located a number of tubes 4. On both sides of the said partitions there are closed chambers 5 and 6 respectively communicating with one another through the tubes 4. The chamber 6 is located between the partition 3 and a curved wall 7 being provided with throttled nozzles 8 which, as is seen from Fig. 2, are curved and their ends directed tangentially to the wall of the cylindrical receptacle 1. The nozzles 8 open into the expansion chamber 9. The chamber 5 is located between the lower partition 2 and the bottom of the apparatus. The chambers 9 and 5 are in communication with one another by a conduit 10 in which there is located a pump 11. The expansion chamber 9 is by another conduit 13, in which there is located a compressor 14, in communication with the heating chamber 12 surrounding the tubes 4 and located between the partitions 2 and 3. The receptacle for liquid to be concentrated is designated by 15 and is connected with the expansion chamber by means of a conduit 16 provided with a valve 17. The concentrated liquid is drawn off from the expansion compartment 9, through a conduit 19. In the pressure conduit of the pump 11 there is located a valve 20 for further regulating the pressure of the liquid.

The apparatus works in the following manner: The liquid to be concentrated is led from the receptacle 15 through conduit 16 into the chamber 9. From this chamber it is drawn off through conduit 10 by the pump 11 and forced by the latter into the lower chamber 5. From here it is forced, also by the action of the pump, upwards through the tubes 4 to the chamber 6 from which it is through the nozzles 8 thrown out into the expansion chamber 9. Due to the nozzles 8 being throttled, i. e. provided with outlet orifices of a considerably smaller section than the tubes 4, a sufficiently high pressure is maintained on the liquid within the externally heated tubes 4 for preventing vapours from being formed within said tubes. No steam bubbles can thus be formed between the tube walls and the liquid that can form an insulating layer preventing the transference of heat, and, moreover, since the tubes are always filled with liquid no evaporation to dry thickness with formation of an insulating cover can take place. When the liquid is thrown into the chamber 9 a violent vaporization takes place. The vapours formed are, due to the curved form of the nozzles and their being located tangentially to the cylindrical wall, held in rotation whereby the liquid particles are separated from the same in the manner explained above. The vapours are led off through conduit 13 to the compressor 14 where the pressure of the same is increased, and under such higher pressure they are forced into the chamber 12 where they give off their heat to the liquid rising in the tubes 4. The uncondensed gases which are separated are led off through the conduit 18. The drawbacks arising from the necessity of leading off air or other uncondensed gases from the solution during the process of evaporation and which are introduced into the heating chamber together with the vapours where they accumulate are in a high degree compensated for by making the heating element as high as possible and by introducing the compressed vapours at the lower end of the heating chamber. It is, however, inevitable that a certain quantity of vapours escapes at the same time as the uncondensed gases, but this drawback can be compensated for by utilizing the heat of said vapours in any convenient manner.

As above stated it may sometimes be convenient to apply a vacuum to the whole system. In this case the suction conduit of an air pump is connected with the conduit 18, said pump removing the uncondensed gases and creating at the beginning of the evaporation the required vacuum. Obviously, however, the amount of vacuum in chamber 12 is maintained substantially less (or the pressure is maintained substantially greater) than in chamber 9.

It is evident that the apparatus shown can be modified in many respects without departing from the scope of the invention. Thus, for instance, the chamber 6 may be omitted and the tubes 4 themselves open directly into the chamber 9 as shown in Fig. 3. In this case each tube 4 is provided with a throttling at or near its outlet end. Instead of a throttling each tube may also be provided with a throttling device, such as a valve, as shown in Fig. 4. By this means it will be possible to regulate from beginning the outlet opening of the tubes to that which is most convenient for a certain liquid. According to Fig. 5 the tube 4 is provided with a throttling (construction at its end) as well as a throttling device valve.

The invention is especially adapted to be used in concentrating waste sulphite cellulose liquor.

Having now described my invention, what I claim as new and desire to secure by Letters Patent is:

1. The method of continuously evaporating liquids or solutions which comprises forcing the liquid under treatment, by means of a pump or the like, through a throttled outlet of a heating element in such manner that an effective resistance to the movement of the liquid through such outlet is effected, while maintaining such a high pressure on the liquid in said heating element that no boiling is effected in said heating element, thereafter admitting streams of such liquid from said throttled outlet into a chamber in which a lower pressure is maintained, compressing the vapors formed in said low pressure chamber and passing the same into a heat conducting relation with the liquid being treated in said heating element.

2. The method of continuously evaporating liquids or solutions which comprises forcing the liquid under treatment, by means of a pump or the like, through throttled passages forming the outlet of a heating element in such manner that an effective resistance to the movement of the liquid through such passages is effected, while maintaining such a high pressure on the liquid in said heating element that no boiling is effected in said heating element, thereafter admitting streams of such liquid from said throttled passages in a substantially tangential direction, into a chamber in which a lower pressure is maintained, compressing the vapors formed in said low pressure chamber and passing the same into a heat conducting relation with the liquid being treated in said heating element.

3. The method of continuously evaporating liquids or solutions which comprises forcing the liquid under treatment, by means of a pump or the like, through throttled passages forming the outlet of a heating element in such manner that an effective resistance to the movement of the liquid through such passages is effected, while maintaining such a high pressure on the liquid in said heating element that no boiling is effected in said heating element, thereafter admitting streams of such liquid from said throttled passages into a chamber in which a lower pressure is maintained, compressing the vapors formed in said low pressure chamber and passing the same into a heat conducting relation with the liquid being treated in said heating element, withdrawing concentrated liquid from said low pressure chamber and supplying unconcentrated liquor thereto.

4. The method of continuously evaporating liquids or solutions which comprises forcing the liquid under treatment by means of a pump or the like, through throttled passages forming the outlet of a heating element in such manner that an effective resistance to the movement of the liquid through such passages is effected, while maintaining such a high pressure on the liquid in said heating element that no boiling is effected in said heating element, thereafter admitting streams of such liquid from said throttled passages into a chamber in which a lower pressure is maintained, forcing liquid from said low pressure chamber into and through said heating element, compressing the vapors formed in said low pressure chamber and passing the same into a heat conducting relation with the liquid being treated in said heating element.

5. An apparatus for concentrating liquids, which comprises a low pressure chamber, and means for pumping liquid therefrom into and through heating elements, a throttled outlet from said heating elements into said low pressure chamber, means for compressing gases and vapors produced in said low pressure chamber and for bringing the same in a compressed state into heat conducting relation with said heating elements.

6. An apparatus for evaporation of liquids, comprising a low pressure chamber, a regulated liquid inlet thereto, and a regulated liquid outlet for drawing off concentrated liquid; another liquid outlet from said low pressure chamber connected through a pump, the pressure side of said pump being in communication with tubular heating elements, and a constricted tangentially arranged liquid outlet from said heating elements into said low pressure chamber; a vapor outlet to said low pressure chamber in communication with a pump for compressing the vapors, the pressure side of said pump being in communication with a space located in heat conducting relation with said heating elements.

7. The method of evaporating liquids, which comprises forcing the liquid over heating surfaces while under pressure sufficiently high to prevent vaporizing thereof while being heated, passing the liquid through a restricted outlet into a closed chamber and so relieving the pressure and allowing vaporization therein, withdrawing and compressing the vapor, and heating the heating surfaces to thereby heat the liquid, and forcing the unvaporized liquid in said chamber over said surfaces.

8. The method of continuously evaporating liquids and solutions, which comprises heating a continuously circulating liquid while under pressure at a point of restriction of its flow, thereafter passing the liquid through restricted outlets at a point of the circuit where pressure is released and evaporation takes place, compressing the vapor thus formed and heating therewith the liquid in the circuit at the first mentioned point.

9. Continuous evaporating apparatus, comprising a low pressure chamber, means for withdrawing liquid therefrom and forcing it into a circuit under pressure back to the chamber, a flow-retarding heat exchanger between said means and chamber, a restricted discharge means for the liquid as it passes back into said chamber, and means to withdraw and compress vapors from the chamber and deliver them to the heat exchanger and subsequently discharge them from the circuit.

In testimony whereof I have affixed my signature in presence of two witnesses.

ERIK SIXTEN SANDBERG.

Witnesses:
AXEL CHRUER,
STURE QVIDINGER.